United States Patent [19]

Hirota et al.

[11] Patent Number: 5,167,896
[45] Date of Patent: Dec. 1, 1992

[54] METHOD OF MANUFACTURING A FRONT CABINET FOR USE WITH A DISPLAY

[75] Inventors: Kashichi Hirota; Junji Fukuda, both of Hachioji, Japan

[73] Assignee: Kyowa Electric & Chemical Co., Ltd., Tokyo, Japan

[21] Appl. No.: 690,807

[22] Filed: Apr. 23, 1991

[30] Foreign Application Priority Data

Jan. 16, 1991 [JP] Japan ................................ 3-3236

[51] Int. Cl.$^5$ ............................................ B29C 45/13
[52] U.S. Cl. .................................. 264/255; 264/45.3; 264/328.8; 264/DIG. 53; 425/130
[58] Field of Search ............... 264/255, 45.3, 328.8, 264/513, DIG. 53, 45.1; 425/130

[56] References Cited

U.S. PATENT DOCUMENTS

| | | | |
|---|---|---|---|
| 4,014,966 | 3/1977 | Hanning | 264/255 |
| 4,035,466 | 7/1977 | Langecker | 264/255 |
| 4,052,497 | 10/1977 | Monnet | 264/255 |
| 4,459,257 | 7/1984 | Baciu | 264/255 |
| 4,715,802 | 12/1987 | Arai | 264/255 |
| 4,743,479 | 5/1988 | Nakamura et al. | 264/513 |
| 4,752,199 | 6/1988 | Arai | 425/130 |
| 4,840,553 | 6/1989 | Arai | 264/328.8 |
| 4,927,579 | 5/1990 | Moore | 264/DIG. 53 |
| 4,980,100 | 12/1990 | Krishnakumar et al. | 264/513 |
| 4,990,301 | 2/1991 | Krishnakumar et al. | 264/513 |
| 5,013,513 | 5/1991 | Schad et al. | 264/328.8 |
| 5,049,345 | 9/1991 | Collette et al. | 425/130 |

*Primary Examiner*—Jan H. Silbaugh
*Assistant Examiner*—Brian J. Eastley
*Attorney, Agent, or Firm*—Frishauf, Holtz, Goodman & Woodward

[57] ABSTRACT

A method of manufacturing a cabinet for use with a display, the cabinet having a sandwiched structure at portions requiring extra strength such as the picture tube or display screen setting portion, the sandwiched structure including a flat outer surface including a resin and a core including a fiber-reinforced resin mixture. Other portions of the cabinet can be formed relatively thin-walled.

4 Claims, 4 Drawing Sheets

METHOD OF MANUFACTURING A FRONT CABINET FOR USE WITH A DISPLAY

BACKGROUND OF THE INVENTION

The present invention relates to a front cabinet for use with a display screen such as a TV set, a computer or a word processor and also relates to a method of manufacturing the same. In particular, the present invention relates to a front cabinet formed integrally with a synthetic resin and a method of injection-molding the cabinet with the synthetic resin.

RELATED ART STATEMENT

It is conventionally known to form a cabinet for use with a display such as a TV set, a computer or a word processor integrally with a synthetic resin. In addition, it has been proposed to form a wall portion of such a cabinet in a sandwiched structure including a core portion made of foamed resin and flat outer surfaces for the purpose of providing the cabinet with the required rigidity. For instance, Japanese Patent Public Disclosure No.1-244696 discloses such a cabinet. This conventional cabinet aims at improving the rigidity and outward appearance by constructing a wall portion other than inner portion of a front frame in a sandwiched structure

OBJECT AND SUMMARY OF THE INVENTION

The aforementioned cabinet made of a synthetic resin is satisfactory with respect to the rigidity and outward appearance. However, recently problem of the difficulty in disposing industrial waste has become serious. The conventional large cabinet with thick walls is difficult to break for disposal and produces large amount of dust.

It is therefore the object of the present invention to provide a cabinet for use with a display screen and a method of manufacturing the same which cabinet produces less dust when broken.

According to the present invention, in order to accomplish the above object, only the portion requiring much strength is formed with a sandwiched structure having a core made of fiber-reinforced resin. Other portions are formed by injection-molding with a single kind of resin. In a preferred embodiment, the portion requiring high strength is formed thicker than other portions. More specifically, the front cabinet according to the present invention is characterized in that the front cabinet includes a front frame portion formed around a picture tube or display screen of a display device and a cabinet portion extending rearwardly from the front frame portion, both of said portions integrally formed of a synthetic resin, that a reverse surface of the front frame is provided with portions for setting a picture tube of a display, that an inner edge portion of the front frame in contact with the picture tube is formed of thin-walled synthetic resin, and that at least in those sections of the front frame portion on which the picture tube is set, the front frame portion is formed in a sandwiched structure including outer surface layers made of a single kind of synthetic resin and fiber-reinforced resin layer interposed between the outer surfaces. In this arrangement, it is preferred to form the sandwiched structure to be thicker than other portions.

The method of manufacturing a cabinet according to the present invention is characterized in that a cavity in a mold for injection-molding is formed shallow at a portion thereof corresponding to an inner edge portion of the front frame portion so that the inner edge portion can be formed thin-walled, that a gate for injecting a first resin is provided between the inner edge portion and the picture tube setting portion, said inner edge portion of the front frame being formed by injecting the first resin from said gate, and that a second resin including fiber for reinforcement is injected between the first resin before the first resin hardens so that a portion of the cavity corresponding to the picture tube setting portion is formed in a sandwiched structure including the fiber-reinforced resin layer interposed between the outer surface layer comprising of a single kind of synthetic resin.

As aforementioned, since the front frame of the cabinet is formed in a sandwiched structure at a portion requiring great strength such as the picture tube setting portion, the required strength is provided even if other portions are formed relatively thin in wall thickness, and good outward appearance can be maintained. In addition, since the core of the sandwiched structure comprises fiber-reinforced resin, the required strength and rigidity of the cabinet can be maintained even if the wall portion thereof is formed thinner than the wall portion would be formed with foamed resin. This brings the result that the cabinet can be formed thinner walled as a whole and the cabinet is able to break more easily with less amount of dust than the conventional cabinet.

The above object and advantageous features of the present invention will be made apparent from the following explanation made with reference to the accompanying drawings.

DESCRIPTION OF THE PREFERRED EMBODIMENTS

Figure 1:
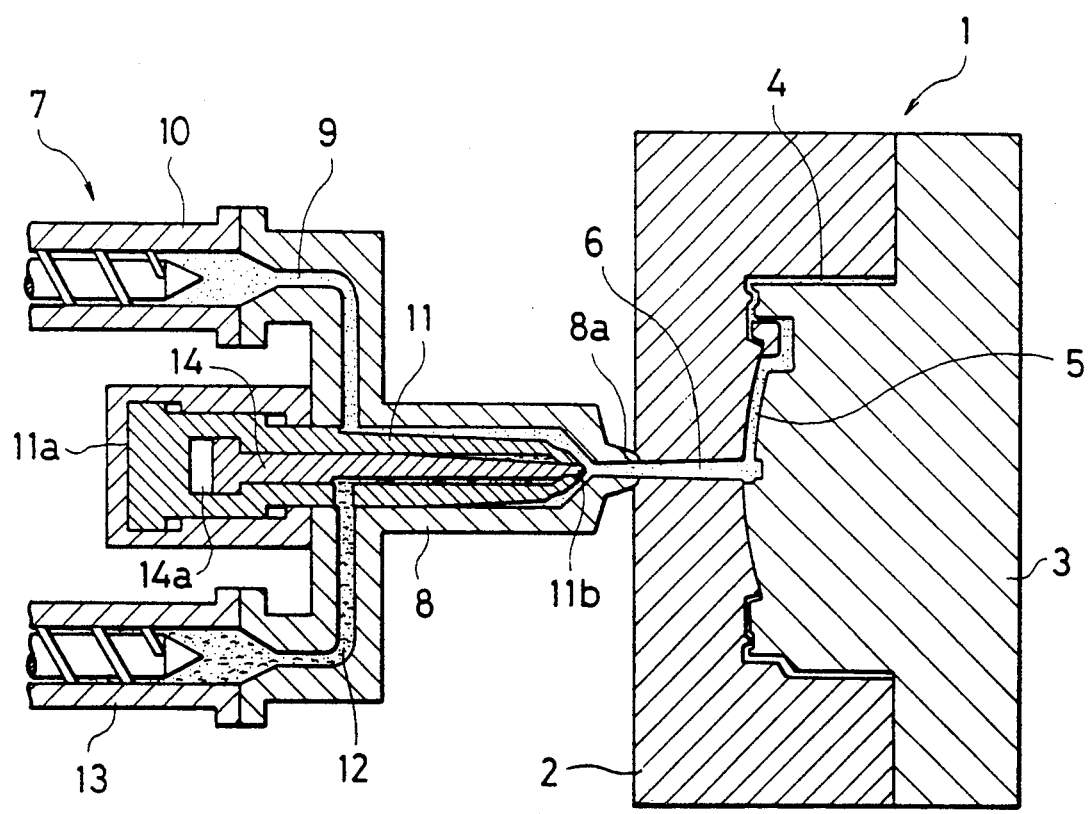
FIG. 1 is a cross-sectional view of the mold and the injection molding apparatus used in the method according to the invention.

FIG. 1 illustrates a mold 1 which is used in a method of manufacturing a cabinet in accordance with the present invention. The mold 1 comprises a fixed mold 2, a movable mold 3 and a cavity 4 formed between the fixed mold 2 and the movable mold 3. Between the molds 2 and 3 a runner 5, in communication with the cavity 4, is provided for introducing resin. The fixed mold 2 is provided with a sprue 6 in communication with the runner 5.

The sprue 6 provided in the mold 2 is connected with a sandwich injection molding apparatus 7. The injection molding apparatus 7 includes an outer cylinder 8 having a nozzle 8a which is to be connected with the sprue 6. A first extrusion cylinder 10 communicates with the inside of the outer cylinder 8 through a resin path 9. The outer cylinder 8 has an axially-slidable first plunger 11 disposed therein. The first plunger 11 is arranged to be forced to the right in FIG. 1 to close the nozzle 8a when pressurized fluid is provided in a chamber 11a adjacent to the left end of the plunger 11. The first plunger 11 is hollow or has an inner chamber which communicates with a second extrusion cylinder 13 through a resin path 12. Furthermore, the first plunger 11 is provided at its tip with a nozzle 11b having an outlet opening which opens towards the nozzle 8a of the outer cylinder 8.

The first plunger 11 has an axially-slidable second plunger 14 disposed therein. A chamber 14a is provided adjacent to the left end of the second plunger 14. The second plunger 14 is arranged to be forced to the right in FIG. 1 to close the nozzle 11b when pressurized fluid is introduced into the chamber 14a.

The first extrusion cylinder 10 extrudes a flow of melted resin. The second extrusion cylinder 13 extrudes a predetermined density of reinforced resin comprising melted resin mixed with reinforcing fiber. The fiber, such as glass fiber, is cut in advance to a predetermined length such as 10 mm through 30 mm. When the pressurized fluid is removed from the chamber 11a, the resin extruded from the first extrusion cylinder 10 through the resin path 9 applies pressure to the first plunger 11 to force the plunger 11 to the left in FIG. 1 so that the nozzle 8a is made to open. Then, the melted flow of resin extruded from the first extrusion cylinder 10 is introduced into the sprue 6 in the fixed mold 2. When pressurized fluid is provided in the chamber 11a and the pressurized fluid is removed from the chamber 14a, the inside of the outer cylinder 8 does not communicate with the sprue 6 and the nozzle 11b communicates with the sprue 6 through the nozzle 8a. In this manner, the melted flow of resin including the reinforcing fiber can be introduced to the sprue 6 from the second extrusion cylinder 13.

Figure 2:
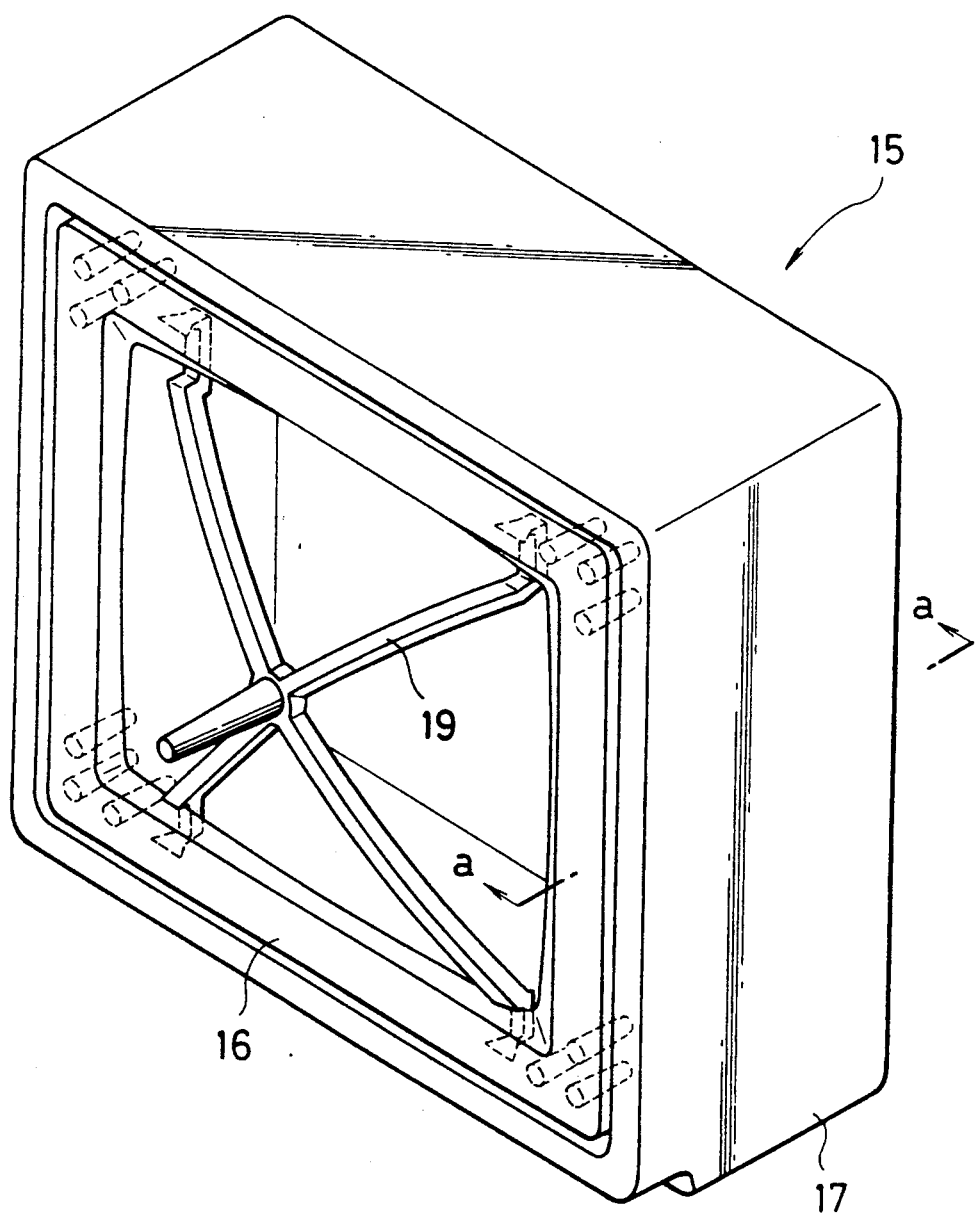
FIG. 2 is a perspective view of the cabinet which is taken out of the mold.
Figure 3:
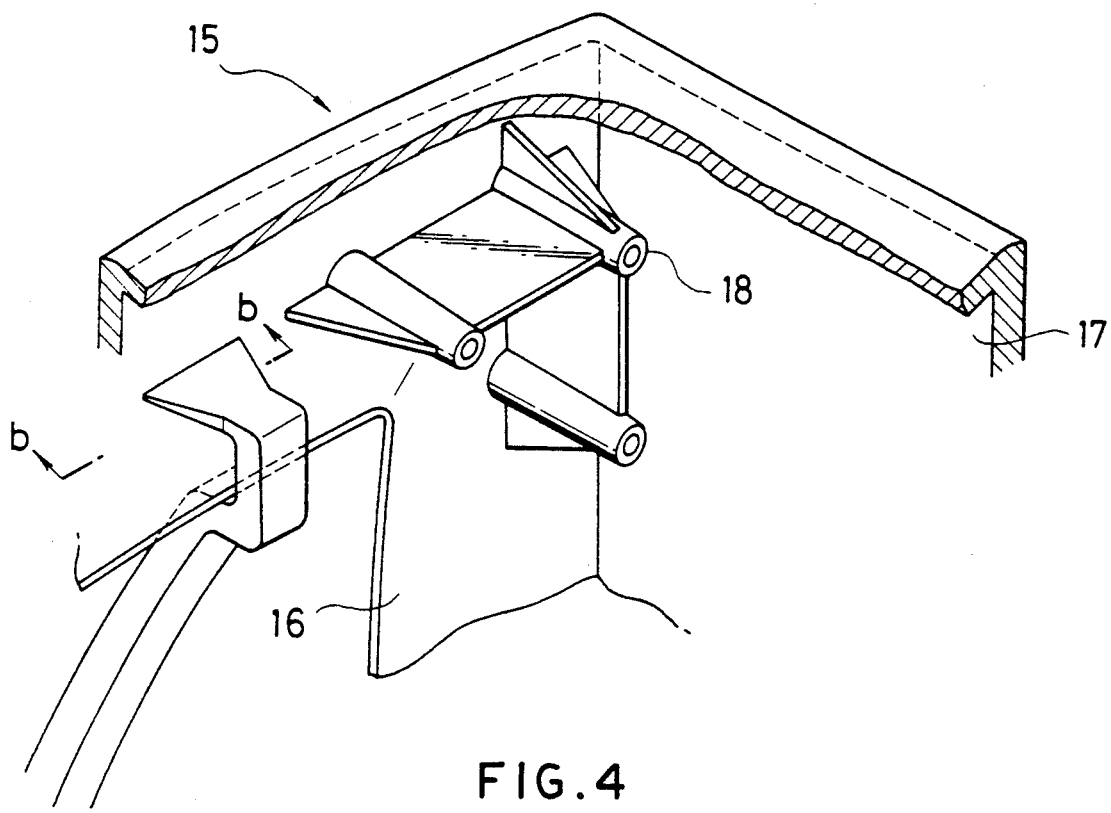
FIG. 3 is a partial perspective view illustrating the reverse side of the corner of the cabinet.

FIG. 2 is a perspective view illustrating a cabinet 15 taken out from the mold 1 after the cabinet 15 has been manufactured in accordance with the method according to the present invention. The cabinet 15 includes a front frame portion 16 formed to frame a picture tube or display screen of a display and a cabinet portion 17 extending rearwardly from the front frame portion 16. Though the cabinet 15 shown in FIG. 2 still holds a portion 19 formed by the runner 5 and the sprue 6 of the mold 1, the portion 19 is removed later. As best shown in FIG. 3, the cabinet 15 has legs 18 for setting a picture tube of a display integrally formed at its four corners on the inner surface of the front frame 16.

Figure 4:
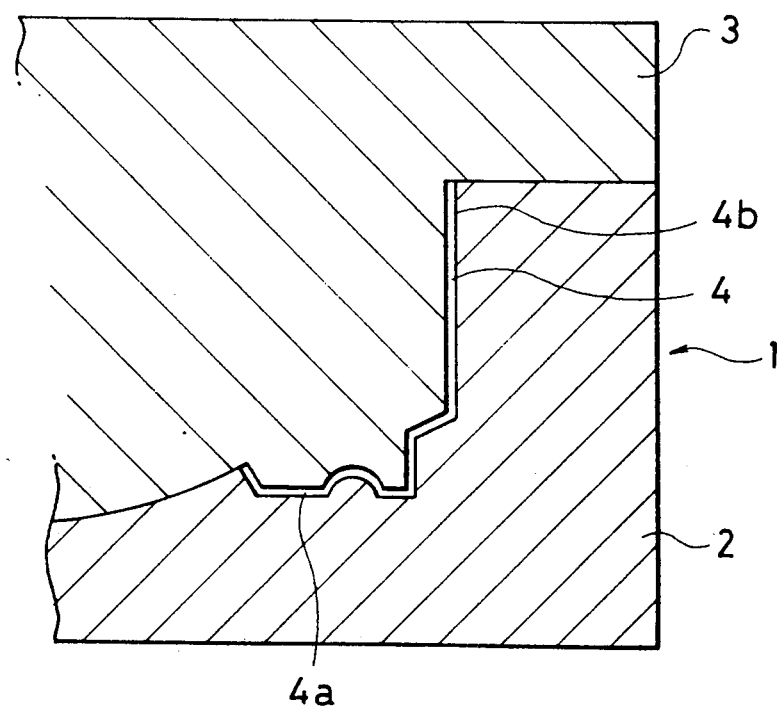
FIG. 4 is a cross-sectional view illustrating an example of the cavity in the mold used in the method in accordance with the invention.
Figure 5:
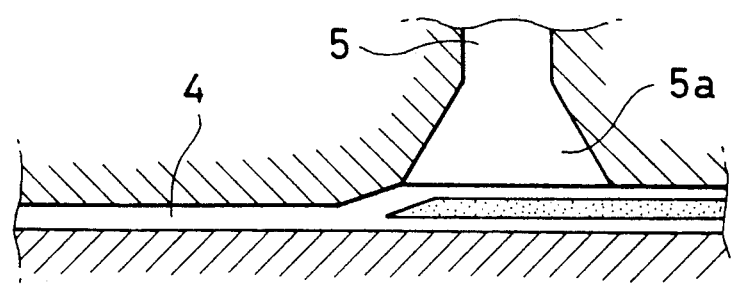
FIG. 5 is a cross-sectional view illustrating the other portion of the cavity.

FIG. 4 illustrates the shape of the cavity 4 for forming the portion corresponding to the cross-section a—a of the cabinet 15 shown in FIG. 2. A cavity portion 4a for forming the front frame portion 16 is arranged to be relatively thin-walled and a cavity portion 4b for forming the cabinet portion 17 is arranged to be also relatively thin-walled at this cross-section. FIG. 5 illustrates the shape of the cavity for forming a portion corresponding to the cross-section b—b in FIG. 3. At this cross-section, the depth of the cavity is determined so that the center of the front frame 16 is formed thin-walled and the corners where the legs 18 are provided are formed thick-walled. The runner 5 for injecting the resin is connected to the cavity 4 through a gate 5a which has flat sides. The gate 5a is formed on the portion of the cavity 4 corresponding to upper and lower horizontal portions of the front frame 16 and at a position displaced from the legs 18 and toward the inner side.

Figure 6:
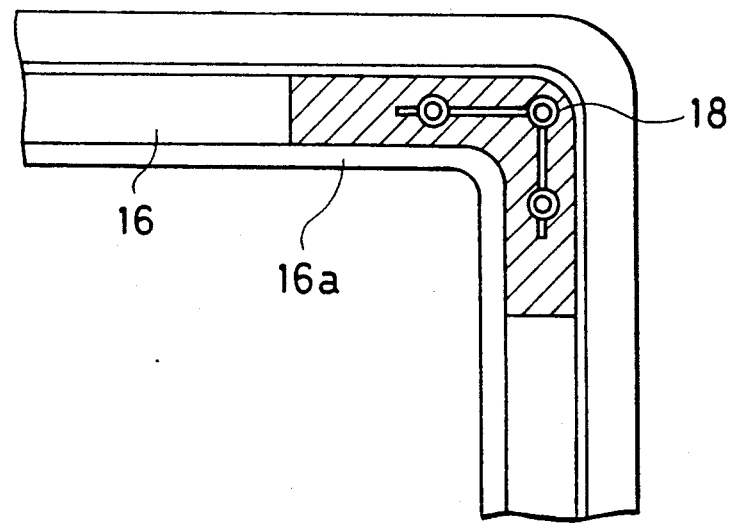
FIG. 6 is a front view indicating the location of the thick-walled portion of the cabinet.

When the cabinet 15 is manufactured by the injection molding apparatus 1, pressurized fluid is introduced to the chamber 14a to close the nozzle 11b of the first plunger 1 and the pressurized fluid in the chamber 11a is removed so that the inside of the outer cylinder 8 can communicate with the nozzle 8a. Then, the first extrusion cylinder 10 is operated to introduce the melted resin into the cavity 4 through the sprue 6 and the runner 5. The melted resin introduced in the cavity 4 begins to harden. At first the portion of the resin in contact with the surface of the cavity 4 hardens. Before the resin hardens which is introduced to the thick-walled portion or the four corners on which the legs 18 are formed, the pressurized fluid is introduced to the chamber 11a and the pressurized fluid in the chamber 14a is removed to cut off the communication between the inside of the outer cylinder 8 and the nozzle 8a and communicate the inside of the first plunger 11 with the nozzle 11b. Then, the second extrusion cylinder 13 is operated to introduce the melted resin including the reinforcing fiber into the cavity 4. The melted resin including the reinforcing fiber penetrates the resin introduced previously to form a sandwiched structure. Thus, the four corners of the front frame portion 16 are formed thick-walled and the other portions of the cabinet 15 is formed thin-walled. In addition, the thick-walled four corners are formed in a sandwiched structure including a flat surface layer portion consisted of the resin and a core portion formed between the surface layers and made of the fiber-reinforced resin including reinforcing fiber. The cabinet 15 manufactured as aforementioned is provided with the required strength although it is relatively thin-walled as a whole. With reference to FIG. 6, it is the four corners on which the picture tube setting legs 18 are formed where the sandwiched structure is provided. The inner edge portion 16a of the front frame 16 which is to be in contact with a picture tube is not provided with the sandwiched structure as shown by the hatch-marked portion of FIG. 6. However, the sandwiched structure may be formed in a portion requiring strength other than the aforementioned four corners.

According to the front cabinet embodying the present invention, the required strength and rigidity can be acquired even if the cabinet is formed relatively thin-walled. Furthermore, the cabinet can maintain its fine outward appearance. Therefore, the cabinet can be broken with much ease and with less dust than the conventional cabinet. In addition, the aforementioned thin-walled cabinet can be manufactured effectively by the method of manufacturing the cabinet in accordance with the invention.

While the present invention has been described in connection with preferred embodiments, it will be understood that it is not intended to limit the invention to these embodiments. On the contrary, it is intended that the present invention cover all alternatives, modifications, and equivalents as may be included within the spirit and scope of the invention as defined by the attached claims.

What is claimed is:

1. A method for making a cabinet for containing a display screen, said cabinet comprising a front frame portion of synthetic resin having an inner edge portion for framing a display screen, a cabinet portion a synthetic resin extending rearward of the front frame portion and integral with the front frame portion, means disposed on interior surfaces of at least one of the front frame portion and said cabinet portion for supporting the display screen, wherein said front frame portion and said cabinet portions are formed of a single layer of synthetic resin except at the interior surfaces on which the means for supporting are disposed which are formed of a sandwich structure of two layers of synthetic resin surrounding a single layer of a mixture of synthetic resin and reinforcing fibers, said method comprising the steps of:

providing a mold for injection molding the cabinet, wherein the mold defines a cavity having a shallow portion for injection molding said front frame portion and said cabinet portion as a single layer of said synthetic resin except for deeper portions for injection molding at each of said interior surfaces on which the means for supporting are disposed;
   providing a source of molten synthetic resin;
   providing a source of mixture of molten synthetic resin and reinforcing fibers;
   providing means for alternatively introducing the molten synthetic resin and the mixture into the mold by means of gates disposed adjacent the deeper portions;
   introducing said molten synthetic resin into the mold through the gates to form the single layer portions; and
   before said synthetic resin hardens in the deeper portions, introducing said mixture into the mold through the gates so that a sandwich structure of two layers of said synthetic resin surrounding a single layer of said mixture is produced in each of the deeper portions of the mold.

2. A method according to claim 1, wherein the front frame portion of the cabinet has an outer edge, two horizontal sections and two vertical sections, and wherein four gates are provided, one in each part of the mold between the inner edge portion and the outer edge of the frame and displaced from the vertical sections of the frame on each of the horizontal sections.

3. A method according to claim 1, wherein the molten synthetic resin consists essentially of a single type of synthetic resin.

4. A method according to claim 1, wherein the molten synthetic resin consists of a single type of synthetic resin.

* * * * *

UNITED STATES PATENT AND TRADEMARK OFFICE
CERTIFICATE OF CORRECTION

PATENT NO. : 5,167,896

DATED : December 1, 1992

INVENTOR(S) : Hirota et al

It is certified that error appears in the above-identified patent and that said Letters Patent is hereby corrected as shown below:

Title page, Section [56] References Cited (right column), insert the following:

Under "U.S. Patent Documents" -

3,412,203  11/1968  D'Angelo
3,015,692  1/1962   Herrington

Under "Foreign Patent Documents" -

EP 0 180 191  5/1986   EPO
1-244696      9/1989   Japan
56-132877     1/1982   Japan Under "Other Documents" -

Patent Abstracts of Japan, Vol.13, No.581 (E-865), December 21, 1989.

Patent Abstracts of Japan, Vol.6, No.12 (E-91) (890), January 23, 1982.

Signed and Sealed this

Eleventh Day of January, 1994

Attest:

BRUCE LEHMAN

*Attesting Officer*  *Commissioner of Patents and Trademarks*